(12) United States Patent
Leftwich

(10) Patent No.: US 9,357,160 B2
(45) Date of Patent: May 31, 2016

(54) MULTIPLE DATABASE, USER-CHOICE-COMPILED PROGRAM AND EVENT GUIDE

(75) Inventor: Jim Leftwich, Palo Alto, CA (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 13/368,771

(22) Filed: Feb. 8, 2012

(65) Prior Publication Data

US 2012/0210363 A1   Aug. 16, 2012

Related U.S. Application Data

(63) Continuation of application No. 12/411,208, filed on Mar. 25, 2009, now Pat. No. 8,132,206, which is a continuation of application No. 10/967,672, filed on Oct. 15, 2004, now Pat. No. 7,543,321, which is a continuation of application No. 09/060,343, filed on Apr. 14, 1998, now abandoned.

(60) Provisional application No. 60/043,248, filed on Apr. 16, 1997.

(51) Int. Cl.
| | |
|---|---|
| H04N 5/782 | (2006.01) |
| H04N 5/445 | (2011.01) |
| H04N 5/76 | (2006.01) |
| H04N 21/433 | (2011.01) |
| H04N 21/435 | (2011.01) |
| H04N 21/45 | (2011.01) |
| H04N 21/462 | (2011.01) |
| H04N 7/16 | (2011.01) |

(52) U.S. Cl.
CPC .......... *H04N 5/782* (2013.01); *H04N 5/44543* (2013.01); *H04N 5/76* (2013.01); *H04N 7/162* (2013.01); *H04N 21/4332* (2013.01); *H04N 21/4351* (2013.01); *H04N 21/4532* (2013.01); *H04N 21/4622* (2013.01)

(58) Field of Classification Search
CPC .......... H04N 21/4622; H04N 7/17318; H04N 5/44543; H04N 21/4782; H04N 21/8586
USPC .................................... 725/48–51; 715/721
See application file for complete search history.

(56) References Cited

U.S. PATENT DOCUMENTS

| | | |
|---|---|---|
| 4,706,121 A | 11/1987 | Young |
| 5,311,423 A | 5/1994 | Clark |
| 5,353,121 A | 10/1994 | Young et al. |
| 5,382,983 A | 1/1995 | Kwoh et al. |

(Continued)

FOREIGN PATENT DOCUMENTS

| | | |
|---|---|---|
| EP | 0662769 | 7/1995 |
| EP | 0854645 A2 | 7/1998 |

(Continued)

OTHER PUBLICATIONS

Uniden UST-4800 Integrated Receiver/Descrambler Installation Guide, dated 1990, 60 pages.

(Continued)

*Primary Examiner* — Benjamin R Bruckart
*Assistant Examiner* — Anthony Bantamoi
(74) *Attorney, Agent, or Firm* — Ropes & Gray LLP

(57) ABSTRACT

An electronic programming guide generator utilizes filters to select only programming filtered to display in an electronic programming guide display.

24 Claims, 6 Drawing Sheets

(56) References Cited

U.S. PATENT DOCUMENTS

| | | | |
|---|---|---|---|
| 5,410,344 | A | 4/1995 | Graves et al. |
| 5,465,113 | A | 11/1995 | Gilboy |
| 5,485,518 | A | 1/1996 | Hunter et al. |
| 5,559,548 | A | 9/1996 | Davis et al. |
| 5,583,763 | A | 12/1996 | Atcheson et al. |
| 5,589,892 | A | 12/1996 | Knee et al. |
| 5,596,373 | A | 1/1997 | White et al. |
| 5,621,456 | A | 4/1997 | Florin et al. |
| 5,623,613 | A | 4/1997 | Rowe et al. |
| 5,671,411 | A | 9/1997 | Watts et al. |
| 5,694,176 | A * | 12/1997 | Bruette et al. .................. 725/43 |
| 5,734,853 | A * | 3/1998 | Hendricks et al. ............ 715/716 |
| 5,801,747 | A | 9/1998 | Bedard |
| 5,912,664 | A | 6/1999 | Eick et al. |
| 5,926,230 | A | 7/1999 | Niijima et al. |
| 5,940,073 | A | 8/1999 | Klosterman et al. |
| 6,005,565 | A * | 12/1999 | Legall et al. .................. 715/721 |
| 6,005,631 | A | 12/1999 | Anderson et al. |
| 6,008,803 | A | 12/1999 | Rowe et al. |
| 6,020,880 | A | 2/2000 | Naimpally |
| 6,133,909 | A | 10/2000 | Schein et al. |
| 6,177,931 | B1 | 1/2001 | Alexander et al. |
| 6,526,575 | B1 | 2/2003 | McCoy et al. |
| 6,539,548 | B1 * | 3/2003 | Hendricks et al. ............ 725/109 |
| 6,564,379 | B1 | 5/2003 | Knudson et al. |
| 6,742,183 | B1 | 5/2004 | Reynolds et al. |
| 6,850,693 | B2 | 2/2005 | Young et al. |
| 7,185,355 | B1 | 2/2007 | Ellis et al. |
| 7,543,321 | B2 | 6/2009 | Leftwich et al. |
| 8,132,206 | B2 | 3/2012 | Leftwich et al. |
| 2003/0135852 | A1 | 7/2003 | Kamemoto |

FOREIGN PATENT DOCUMENTS

| | | |
|---|---|---|
| EP | 0858223 A2 | 8/1998 |
| EP | 0924927 | 6/1999 |
| EP | 0944253 | 9/1999 |
| EP | 1228643 | 8/2002 |
| EP | 0858223 B1 | 9/2003 |
| EP | 0854645 B1 | 10/2009 |
| JP | 06-153109 | 5/1994 |
| JP | 07-297796 A | 11/1995 |
| JP | 08-289218 | 11/1996 |
| JP | 08-289219 | 11/1996 |
| JP | 09-37168 | 2/1997 |
| WO | WO 96/17473 | 6/1996 |
| WO | WO 96/25821 | 8/1996 |
| WO | WO 96/41471 | 12/1996 |
| WO | WO-9641477 | 12/1996 |
| WO | WO-97/13368 | 4/1997 |
| WO | WO-97/30546 | 8/1997 |
| WO | WO-9749237 | 12/1997 |
| WO | WO 98/07277 | 2/1998 |
| WO | WO-98/26584 | 6/1998 |
| WO | WO-99/04561 | 1/1999 |
| WO | WO-9956473 | 11/1999 |
| WO | WO-0135662 | 5/2001 |

OTHER PUBLICATIONS

U.S. Appl. No. 09/034,939 (now abandoned).
U.S. Appl. No. 09/410,332 (now abandoned).
U.S. Appl. No. 09/332,244 (now abandoned).
U.S. Appl. No. 09/330,792 (now abandoned).
U.S. Appl. No. 09/356,268 (now abandoned).
PCT Search Report of PCT/US98/07567.

* cited by examiner

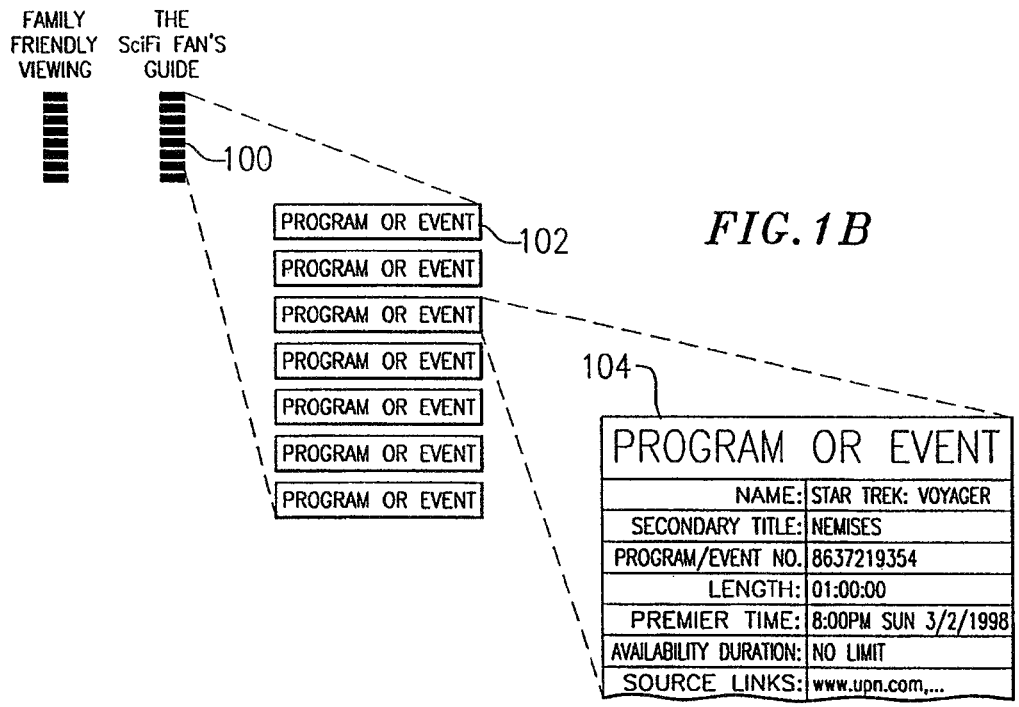
FIG. 1B
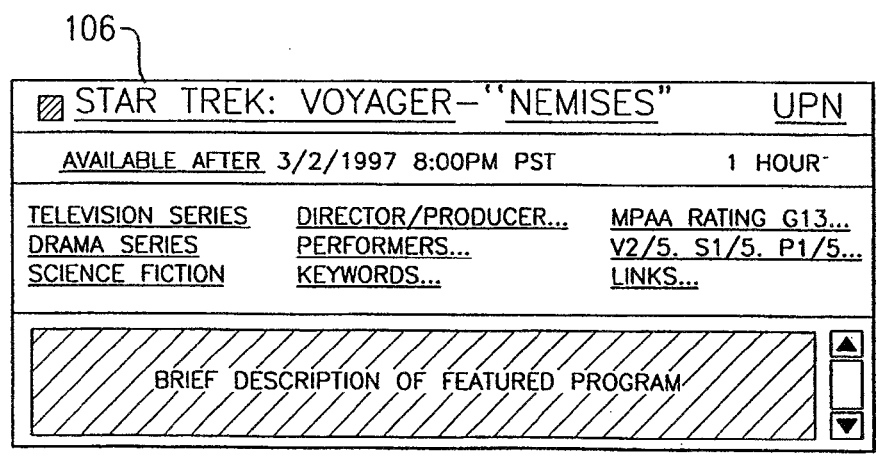

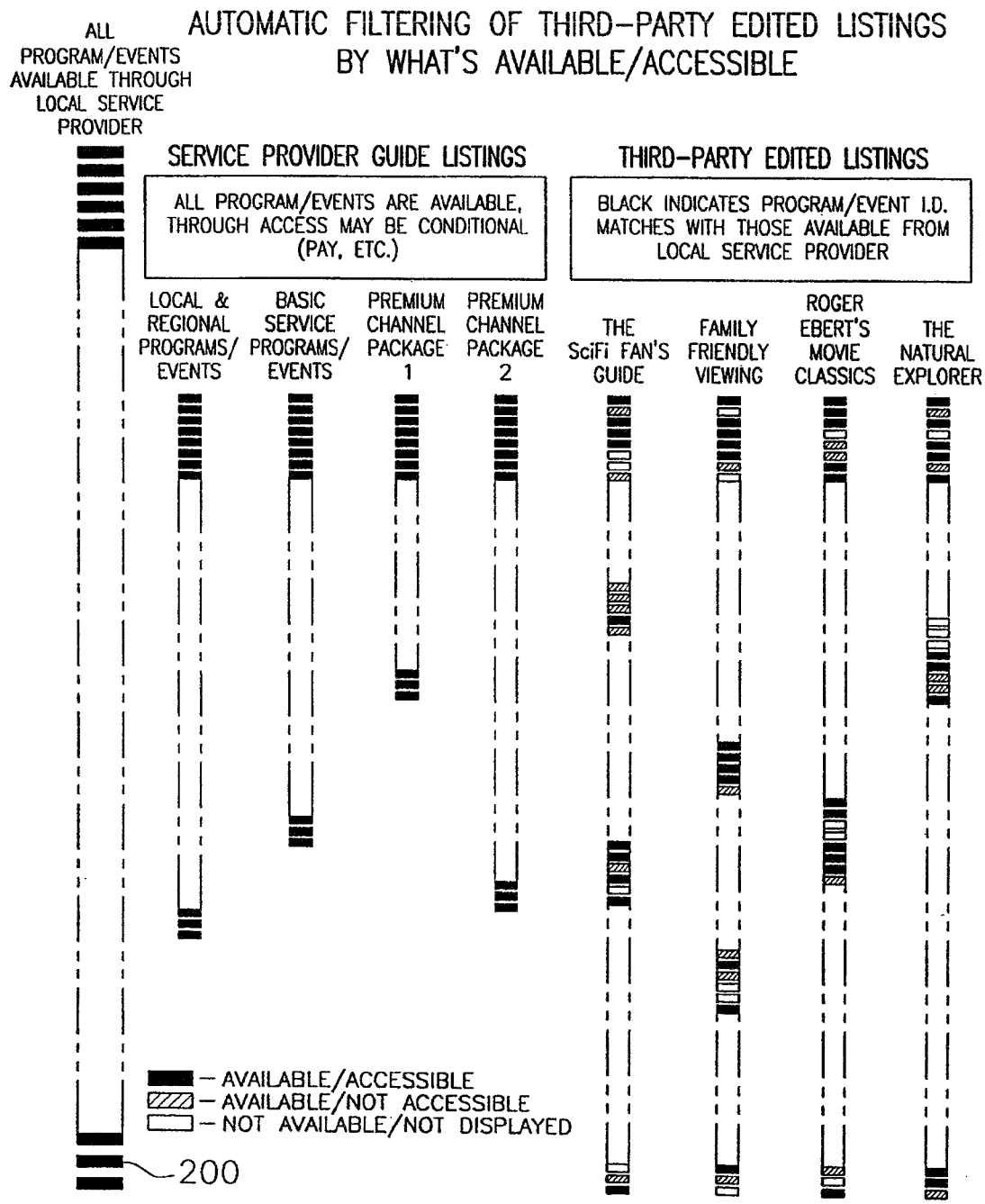

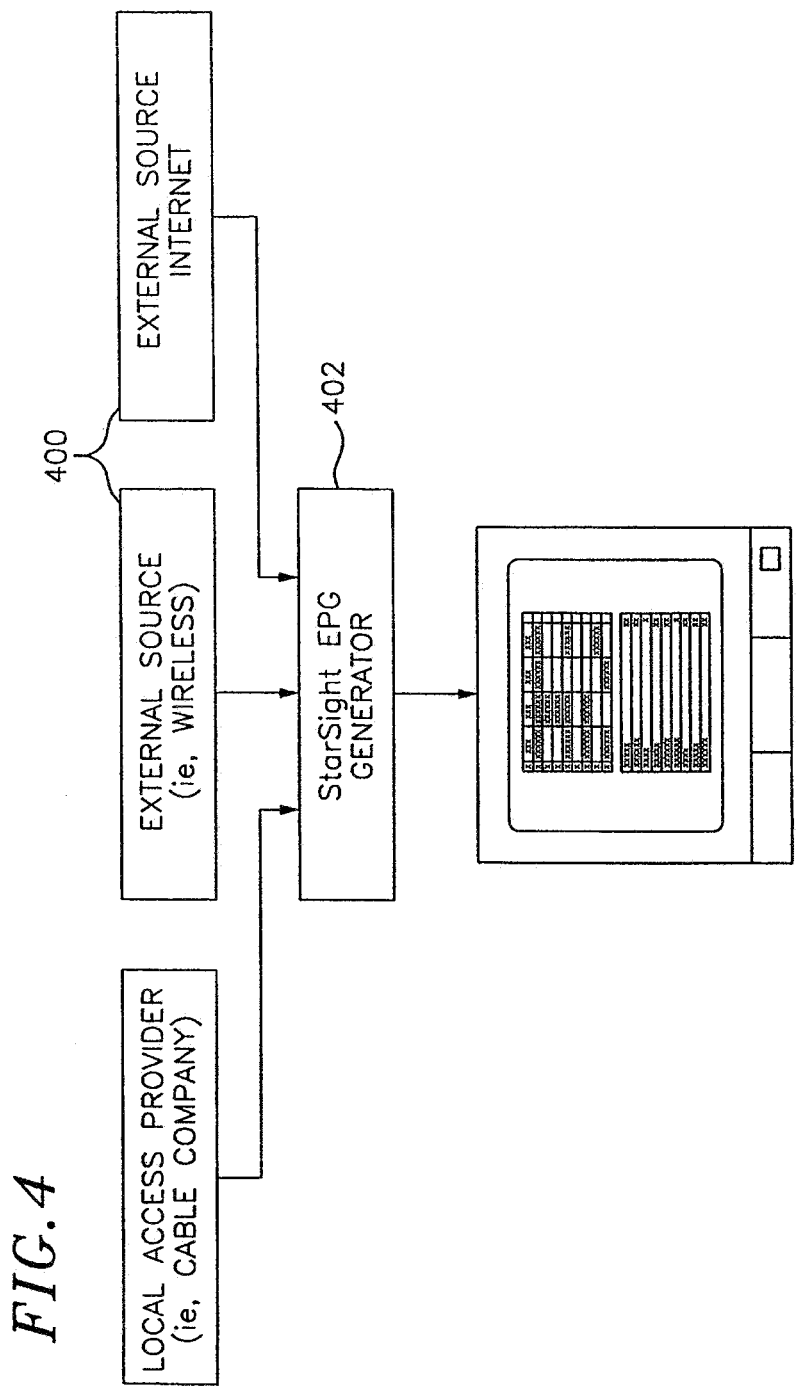

MULTIPLE DATABASE, USER-CHOICE-COMPILED PROGRAM AND EVENT GUIDE

This application is a continuation of U.S. patent application Ser. No. 12/411,208 filed Mar. 25, 2009, which is a continuation of U.S. patent application Ser. No. 10/967,672 filed Oct. 15, 2004, which is a continuation of U.S. patent application Ser. No. 09/060,343 filed Apr. 14, 1998, which claims the benefit of U.S. Provisional Application No. 60/043,248, filed Apr. 16, 1997, the complete disclosures of which are incorporated herein by reference.

BACKGROUND OF THE INVENTION

The present invention generally relates to television schedule information, and more particularly to a system and method for providing previews of scheduled programming to assist a viewer in making scheduling decisions.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem of interconnectivity with other computers over networks, intranets, and the internet, and be connectable to computer peripherals such as printers. Such capabilities as near "video on demand" (NVOD), "video on demand," "access to the world wide web," "audio on demand," etc., will present the viewer with a plethora of information and bandwidth.

As has become increasingly evident, information overload can actually reduce the usefulness of the information delivered. Accordingly, a great challenge exists to provide an interface that manages and provides an intelligent, user-friendly interface to the information available.

Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. Today's guides have only a single source listing, with all available programming presented in a time-based schedule grid. There is also no current ability to allow third parties with different finding/filtering criteria to create useful listings and/or access for viewers.

Also, there is an increasingly important dual need among users to both screen out unwanted programming and find desired programming. As the number of programs/events accessible increases, these issues will become even more important and current strategies such as simple program ratings will not be effective or efficient enough to handle these interrelated user needs.

SUMMARY OF THE INVENTION

The present invention is related to the complementary aspects of Finding Programming and Blocking Programming. The model assumes that certain channels are available to a viewer and other channels are accessible.

According to one aspect of the invention, Editable Filters (EFs) are created based on a standardized program database. These EFs include a basic menu supplied upon startup and optional menus which could be included in the SS database or be downloadable from the WWW. Third party editors will be able to build an EF by utilizing entries which are used to interact with the DB.

According to another concept of the invention, the editable filters are ordered in a hierarchy. Channel select and parental control filters will supersede all other filters. Thus, even if a selected EF allows a program, parental control will override the selection.

According to another aspect of the invention, the viewer will register to use a list.

Other features and advantages will be apparent in view of the detailed description filed herewith and the following claims.

BRIEF DESCRIPTION OF THE DRAWINGS

FIG. 1B is a schematic diagram depicting an implementation of a filter;

FIG. 2A is a schematic diagram depicting source provider guide listings and third-party edited listings;

FIG. 4 is a schematic diagram depicting program/event sources for a PCTV utilizing a filter system.

DETAILED DESCRIPTION OF THE PREFERRED EMBODIMENTS

Electronic programming guides (EPGs) are well-known in the art. One type of programming guide is provided by the assignee of the present invention, StarSight and described in U.S. Pat. No. 5,169,274, and is displayed as a grid of program entries with the vertical axis of the grid being the channels or program sources of program entries and the horizontal axis being starting times of programming entries. Other EPGs are provided by satellite services.

An EPG is generated from a data base based on programming provided by a local service provider. Existing EPG services include some program blocking features and also provide for selecting favorite channels and ordering the channels in a preferred manner.

Figure 1A:
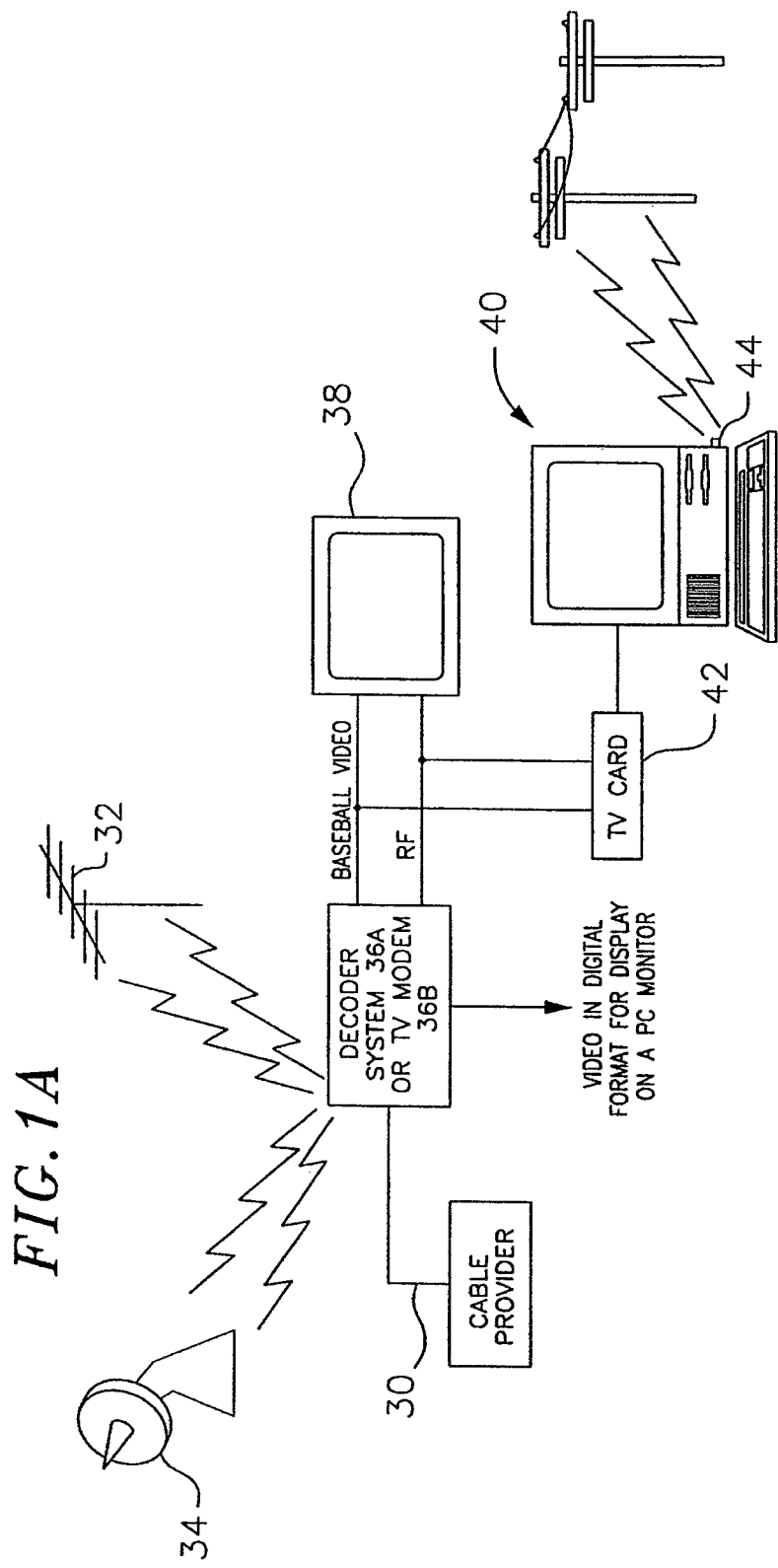
FIG. 1A is a schematic drawing of a television system.

In a preferred embodiment, the electronic program guide of the invention may be implemented either on a personal computer, a PCTV, a television connected to a set-top box, or a television including a custom board. However, the invention is not limited to any particular hardware configuration and will have increased utility as new combinations of computers and television systems are developed. In the following, any of the above will sometimes be referred to as a "TV system." Block diagrams of representative TV systems are depicted in FIG. 1A. Details of implementation are not depicted because the invention is not limited to any particular TV system.

As is well-known, the picture to be displayed may be transmitted as an analog signal, for example according to the NTSC standard utilized in the United States, or as a digital signal modulated onto an analog carrier. The signals may be received over a cable or via an antenna or satellite dish. Typically, television sets are designed to receive analog signals and computer display devices are designed to display pictures encoded in a digital format. However, the decoder system converts the digital data to an analog signal for display on a television set and TV modems can format analog TV signals for display on a monitor.

In FIG. 1A, analog or digital TV signals, received via cable 30, antenna 32, or satellite dish 34, are provided to a television system. If the signal is from a digital broadcast service, then a decoder 36 converts the signal to baseband video and audio or channel 3/4 RF. If the signal is an analog signal it is passed through as a live video output. The television system 38, depending on its configuration, receives selected ones of the outputs and displays the received program.

A PCTV includes a TV card 42, connected to either live video, baseband video, or channel 3/4 output, digitizes the video image and displays the video image in a resizable window on the computer monitor. The PCTV is also coupled to land telephone lines by a modem 44.

If the received signal is an analog TV signal, the TV card of the PCTV digitizes the analog signal and extracts included information from the vertical blanking intervals. On the other hand, if the signal is a digital signal, separate audio, video, VBI (vertical blanking information such as closed caption, teletext, and program related information), program guide, and conditional access information are provided as separate bitstreams. The video and audio bitstreams for programs are converted to a format for display and the program guide information is processed to form a program guide database. The processor, executing software stored in memory, generates interactive electronic program guide images and images of received programs. The guide can be used to interact with and control programs displayed in the window.

In a preferred embodiment of the invention, filters are utilized to select and screen programming displayed by an EPG. In this context a filter is a mechanism for selecting programs based on a selected criterion or criteria.

However, for a filter to be useful in the present context, it is in the form of a list of programs or event entries where the entries must be in a format usable by the EPG generating system.

An example of a useable format for filters is depicted in FIG. 1B. In FIG. 1B, a filter 100 is a list of a program or event entries 102. The filter entitled "The Sci-Fi Fan's Guide" is a list of programs selected according to a criterion or criteria that selects programs of interest to sci-fi fans.

The format for a program or event entry is depicted in the table 104. The information in the table is used by the EPG generating system to generate an EPG display as described below. The table could be formatted in HTML so that the filter entries 102 could be displayed in a user friendly format 106.

In a preferred embodiment both service provider guide listings and third-party edited guide listings are utilized to select programming displayed in the EPG.

Examples of Subscription-Based, Filtering Program/Event Services; Live or Archived e.g.: The Family-Friendly Subscription Service (delivering a described/understood mix of general audience programs/events, some of which may be custom-selected according to a subscriber's viewing history/preferences.)

e.g.: The Science Source Subscription Service (delivering a described/understood mix of science-related programs/events, some of which may be custom-selected according to a subscriber's viewing history/preferences.)

e.g.: Bob Smith's Cult Film Access Listing (allowing a Starsight user to incorporate a third party's list into the Guide) (providing access links to a described/understood mix of cult film-related programs/events.)

FIG. 2A illustrates the use of third-party edited guide listings. The entire universe of available programming is indicated by the list of all programs/events provided by the local service provider 200.

As depicted in FIG. 2A, some of the programs listed in the Sci-Fi Fan's Guide are either not available (light gray bar) or available/not accessible (dark gray bar). A program available but not accessible is a premium program not subscribed to by the user.

The EPG generator utilizes the filter to display those programs available/accessible in the EPG. Alternatively, programs available/not accessible might also be displayed as an incentive to the viewer to subscribe to the premium program which meets a selected filter's criterion or criteria. This could be a powerful revenue generator for the service provider.

Figure 2B:
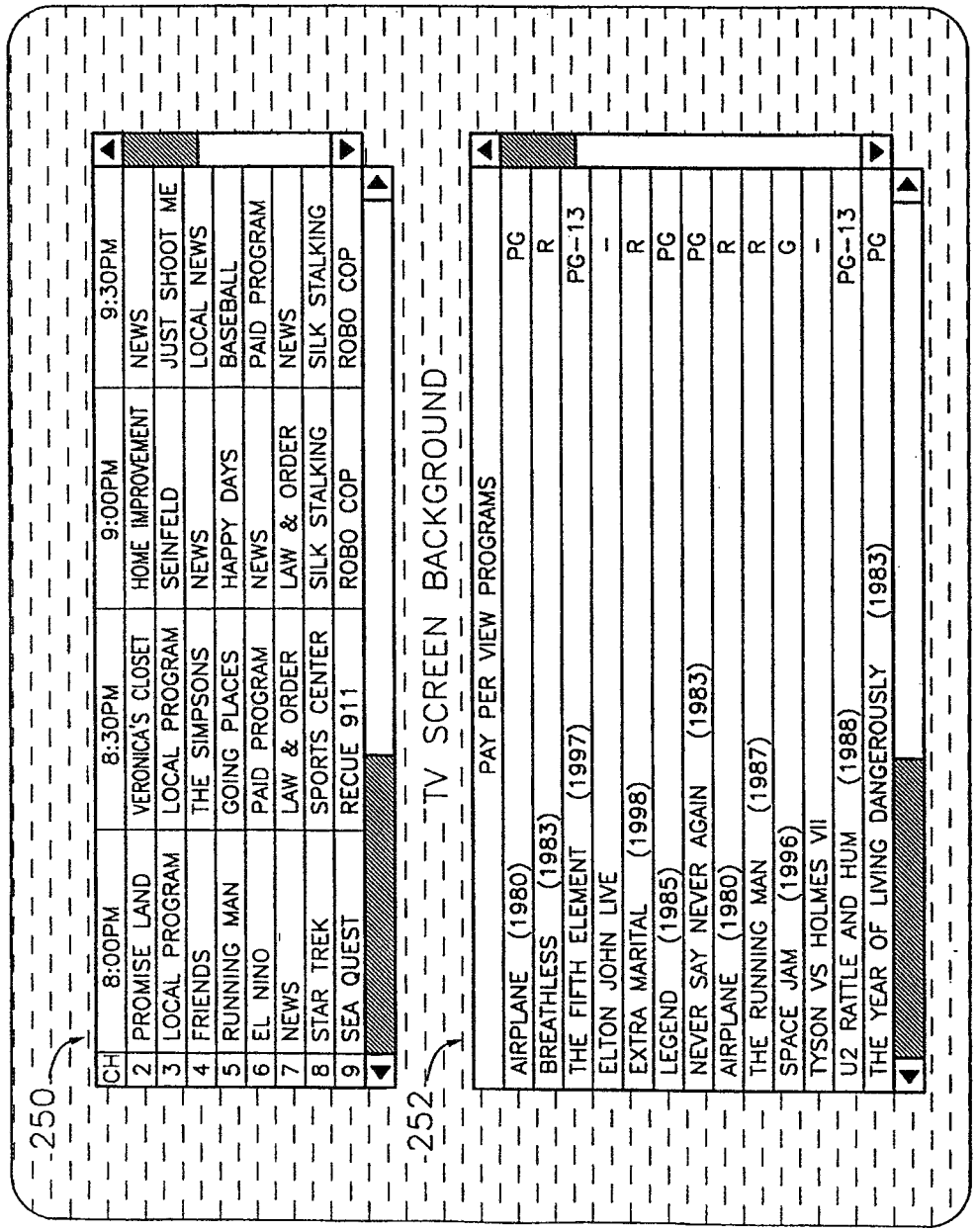
FIG. 2B is a schematic diagram depicting alternative formats of an EPG display.

FIG. 2B depicts alternate ways of formatting an EPG. For programs events which are available only at prescribed times the show listings are displayed in a grid 250. Those programs/events which are randomly accessible, e.g., archives, libraries, file libraries, etc., appear in a list section of the EPG.

In a preferred embodiment, the actual filtering of the programs to be displayed in an EPG is performed utilizing the Program/Event ID in the entry table 104 (FIG. 1B).

Figure 3:
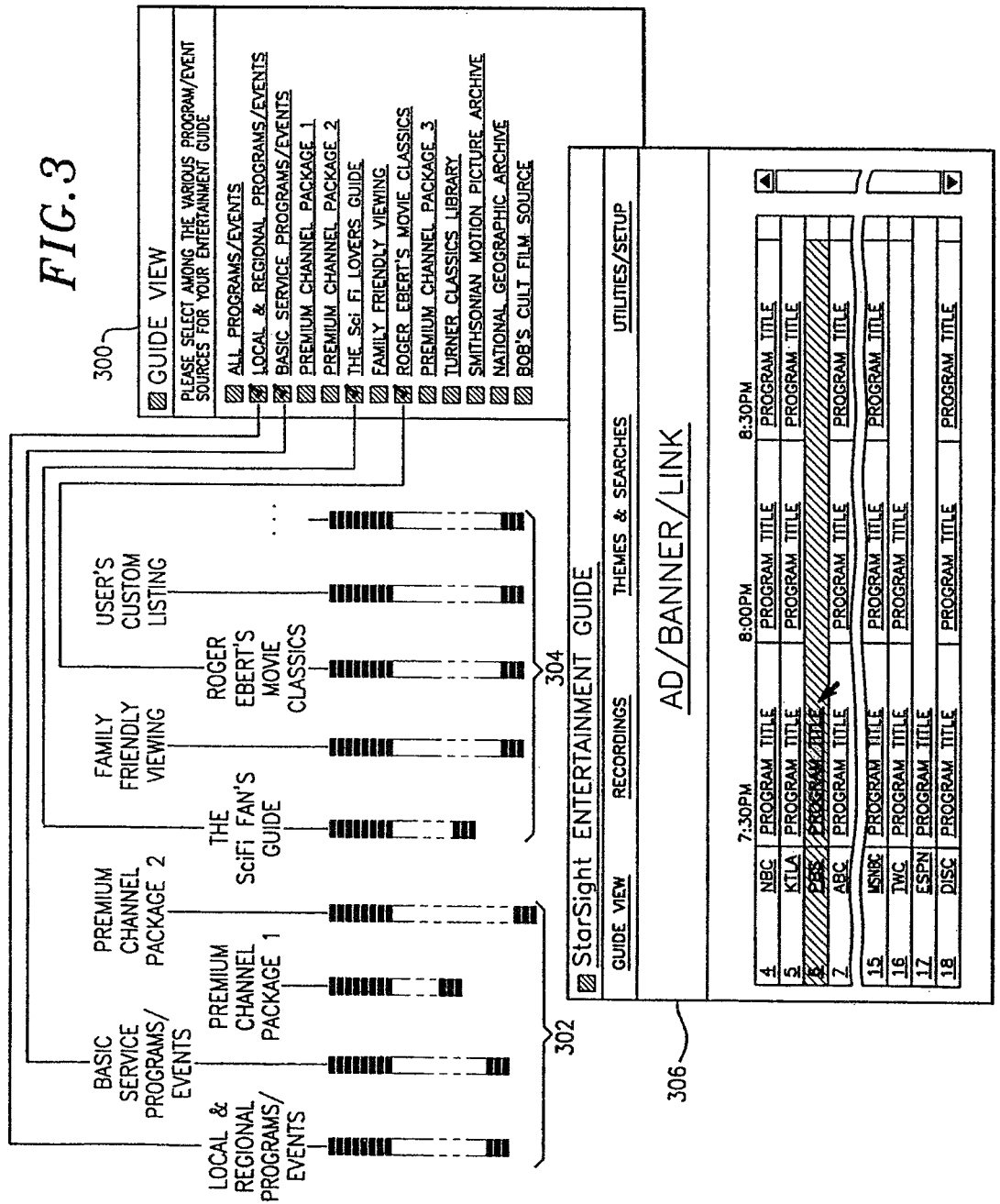
FIG. 3 is a schematic diagram of a system of selecting filters.

In the present embodiment, the EPG generator provides an interactive filter selective mechanism. In FIG. 3, a user configuration screen 300 lists both service provider filters 302 and third-party filters 304. Each time a new filter is added it is registered with the EPG generator and added to the list in the user configuration screen 300. Only those programs filtered by the selected filters will be displayed on the EPG screen 306.

In a preferred embodiment, the filters may be prioritized. For example, in a family with small children the most important criteria might be that a program be included in the Family Friendly Viewing filter. This filter is assigned the highest priority. Then, for example, a program included in the Sci-Fi Fan's filter but not included in the Family Friendly Viewing filter would not be displayed in the guide. Further, the filters could be prioritized by time. Family Friendly Viewing would have the highest priority during the hours when children are viewing and then automatically drop to a later priority during late hours.

In the example described above with reference to FIG. 2A, the filters were applied to programming provided by the local service provider over a cable. However, as depicted in FIG. 4, the filters may also be applied to programs and events delivered by non-cable sources such as wireless, Internet, and satellite. These non-cable sources 400 supply program guide data to the EPG generator 402 which is stored in a data base. The filters can then be applied to program data stored in the data base to generate a filtered EPG for cable and non-cable programming.

Another use of non-cable supplied information is to use the internet to provide offers for premium cable-supplied subscription services. The subscription is initiated through the internet and premium subscription service is made available to the user.

What is claimed is:

1. A method for providing Internet-delivered programs to a user of an interactive program guide, the method comprising:
   receiving a list of filters from a filter provider;
   generating for simultaneous display:
      the list of filters, each filter corresponding to a predetermined list of Internet-delivered programs, wherein the list of filters comprises a first filter created by the filter provider; and
      a second filter that is (1) created by and (2) available from a content provider that is different from the filter provider and the user;
   receiving a user selection of a filter of the displayed filters; and
   generating for display the list of Internet-delivered programs corresponding to the selected filter.

2. The method of claim 1, wherein generating for display the list of Internet-delivered programs corresponding to the selected filter comprises generating for display at least one HTML formatted table.

3. The method of claim 1, wherein at least one of the Internet-delivered programs is randomly accessible by the user.

4. The method of claim 1, further comprising receiving a new filter and including the new filter in the list of filters.

5. The method of claim 1, further comprising receiving a user selection of at least one of the Internet-delivered programs in the list, and generating for display the selected at least one Internet-delivered program.

6. A system for providing Internet-delivered programs to a user of an interactive program guide, the system comprising:
   control circuitry configured to:
      receive a list of filters from a filter provider;
      generate for simultaneous display:
         the list of filters, each filter corresponding to a predetermined list of Internet-delivered programs, wherein the list of filters comprises a first filter created by the filter provider; and
         a second filter that is (1) created by and (2) available from a content provider that is different from the filter provider and the user;
      receive a user selection of a filter of the displayed filters; and
      generate for display the list of Internet-delivered programs corresponding to the selected filter.

7. The system of claim 6, wherein the control circuitry configured to generate for display the list of Internet-delivered programs corresponding to the selected filter is further configured to generate for display the list of Internet-delivered programs in at least one HTML formatted table.

8. The system of claim 6, wherein at least one of the Internet-delivered programs is randomly accessible by the user.

9. The system of claim 6, wherein the control circuitry is further configured to receive a new filter and cause the new filter to be included in the list of filters.

10. The system of claim 6, wherein the control circuitry is further configured to receive a user selection of at least one of the Internet-delivered programs in the list, and generate for display the selected at least one Internet-delivered program.

11. A non-transitory machine-readable medium for providing Internet-delivered programs to a user of an interactive program guide, the machine-readable media comprising machine-readable instructions encoded thereon for:
   receiving a list of filters from a filter provider;
   generating for simultaneous display:
      the list of filters, each filter corresponding to a predetermined list of Internet-delivered programs, wherein the list of filters comprises a first filter created by the filter provider; and
      a second filter that is (1) created by and (2) available from a content provider that is different from the filter provider and the user;
   receiving a user selection of a filter of the displayed filters; and
   generating for display the list of Internet-delivered programs corresponding to the selected filter.

12. The non-transitory machine-readable medium of claim 11, wherein the non-transitory machine-readable medium further comprises additional machine-readable instructions encoded thereon for generating for display the list of Internet-delivered programs in at least one HTML formatted table.

13. The non-transitory machine-readable medium of claim 11, wherein at least one of the Internet-delivered programs is randomly accessible by the user.

14. The non-transitory machine-readable medium of claim 11, wherein the non-transitory machine-readable medium further comprises additional machine-readable instructions encoded thereon for receiving a new filter and including the new filter in the list of filters.

15. The non-transitory machine-readable medium of claim 11, wherein the non-transitory machine-readable medium further comprises additional machine-readable instructions encoded thereon for receiving a user selection of at least one of the Internet-delivered programs in the list, and generating for display the selected at least one Internet-delivered program.

16. The method of claim 1, wherein the selected filter in the list of filters is created, prior to receiving the user selection of the filter, by:
   selecting the predetermined list of Internet-delivered programs, corresponding to each filter, from a plurality of Internet-delivered programs; and
   associating the selected predetermined list of Internet-delivered programs with the filter.

17. The system of claim 6, wherein the selected filter in the list of filters is created, prior to receiving the user selection of the filter, by:
   selecting the predetermined list of Internet-delivered programs, corresponding to each filter, from a plurality of Internet-delivered programs; and
   associating the selected predetermined list of Internet-delivered programs with the filter.

18. The non-transitory machine-readable medium of claim 11, wherein the selected filter in the list of filters is created, prior to receiving the user selection of the filter, by:
   selecting the predetermined list of Internet-delivered programs, corresponding to each filter, from a plurality of Internet-delivered programs; and
   associating the selected predetermined list of Internet-delivered programs with the filter.

19. A method for simultaneously presenting filters from multiple sources, the method comprising:
   receiving a plurality of filters from a provider of an interactive media guidance application, wherein the plurality of filters comprises a first filter created by the provider of the interactive media guidance application, and wherein each filter from the plurality of filters corresponds to a plurality of Internet-delivered programs;
   determining that a second filter is available to the interactive media guidance application, wherein the second filter is both (1) created by and (2) available from a provider that is (i) not the provider of the interactive media guidance application and (ii) not an individual user that consumes media by way of the interactive media guidance application;
   adding the second filter to the plurality of filters;
   generating for simultaneous display the first filter and the second filter;

receiving a user selection of the second filter that was not created by or available from the provider of the interactive media guidance application; and based on the user selection, generating for simultaneous display, using the interactive media guidance application, a plurality of identifiers of Internet-delivered programs.

20. The method of claim 19, wherein the plurality of identifiers of Internet-delivered programs is provided by the provider of the interactive media guidance application.

21. The method of claim 19, wherein the second filter is created based on a criterion of the provider that is not the provider of the interactive media guidance application and is not an individual user that consumes media by way of the interactive media guidance application.

22. A system for simultaneously presenting filters from multiple sources, the system comprising:

control circuitry configured to:

receive a plurality of filters from a provider of an interactive media guidance application, wherein the plurality of filters comprises a first filter created by the provider of the interactive media guidance application, and wherein each filter from the plurality of filters corresponds to a plurality of Internet-delivered programs;

determine that a second filter is available to the interactive media guidance application, wherein the second filter is both (1) created by and (2) available from a provider that is (i) not the provider of the interactive media guidance application and (ii) not an individual user that consumes media by way of the interactive media guidance application;

add the second filter to the plurality of filters;

generate for simultaneous display the first filter and the second filter;

receive a user selection of the second filter that was not created by or available from the provider of the interactive media guidance application; and based on the user selection, generate for simultaneous display, using the interactive media guidance application, a plurality of identifiers of Internet-delivered programs.

23. The system of claim 22, wherein the plurality of identifiers of Internet-delivered programs is provided by the provider of the interactive media guidance application.

24. The system of claim 22, wherein the second filter is created based on a criterion of the provider that is not the provider of the interactive media guidance application and is not an individual user that consumes media by way of the interactive media guidance application.

* * * * *